United States Patent [19]

Ono

[11] Patent Number: 5,084,813

[45] Date of Patent: Jan. 28, 1992

[54] RULE BASED SYSTEM FOR SYNTHESIZING A PROGRAM SUITED FOR A TARGET SYSTEM IN RESPONSE TO AN INPUT TARGET SYSTEM SPECIFICATION

[75] Inventor: Yasuko Ono, Tokyo, Japan

[73] Assignee: Kabushiki Kaisha Toshiba, Kawasaki, Japan

[21] Appl. No.: 340,477

[22] Filed: Apr. 19, 1989

[30] Foreign Application Priority Data

Apr. 20, 1988 [JP] Japan .................. 63-95413
Dec. 27, 1988 [JP] Japan .................. 63-329749

[51] Int. Cl.⁵ ............................ G06F 15/18
[52] U.S. Cl. ....................... 395/1; 364/274.5;
364/274; 364/274.3; 364/274.1; 364/DIG. 1
[58] Field of Search ... 364/200 MS File, 900 MS File,
364/513

[56] References Cited

U.S. PATENT DOCUMENTS

| 4,528,623 | 7/1985 | Tachibana | 364/188 |
| 4,607,327 | 8/1986 | Kishi | 364/188 |
| 4,679,137 | 7/1987 | Lane | 364/188 |
| 4,827,404 | 5/1989 | Barstow | 364/188 |
| 4,835,730 | 5/1989 | Shimano | 364/513 |
| 4,862,345 | 8/1989 | Lekron | 364/188 |
| 4,931,950 | 6/1990 | Isle | 364/188 |
| 4,939,635 | 7/1990 | Seki | 364/188 |
| 4,949,253 | 8/1990 | Chigira | 364/200 |
| 4,974,160 | 11/1990 | Bone | 364/191 |

OTHER PUBLICATIONS

Artificial Intelligence Based Programmable Controller Software Designing.

*Primary Examiner*—Thomas C. Lee
*Assistant Examiner*—Eric Coleman
*Attorney, Agent, or Firm*—Oblon, Spivak, McClelland, Maier & Neustadt

[57] ABSTRACT

An automatic program synthesizer receives a system specification and searches software parts suited to the specification. In order to obtain a function satisfying the system specification, the searched software parts are corrected or converted in accordance with a knowledge base for customizing a programming form stored therein.

10 Claims, 9 Drawing Sheets

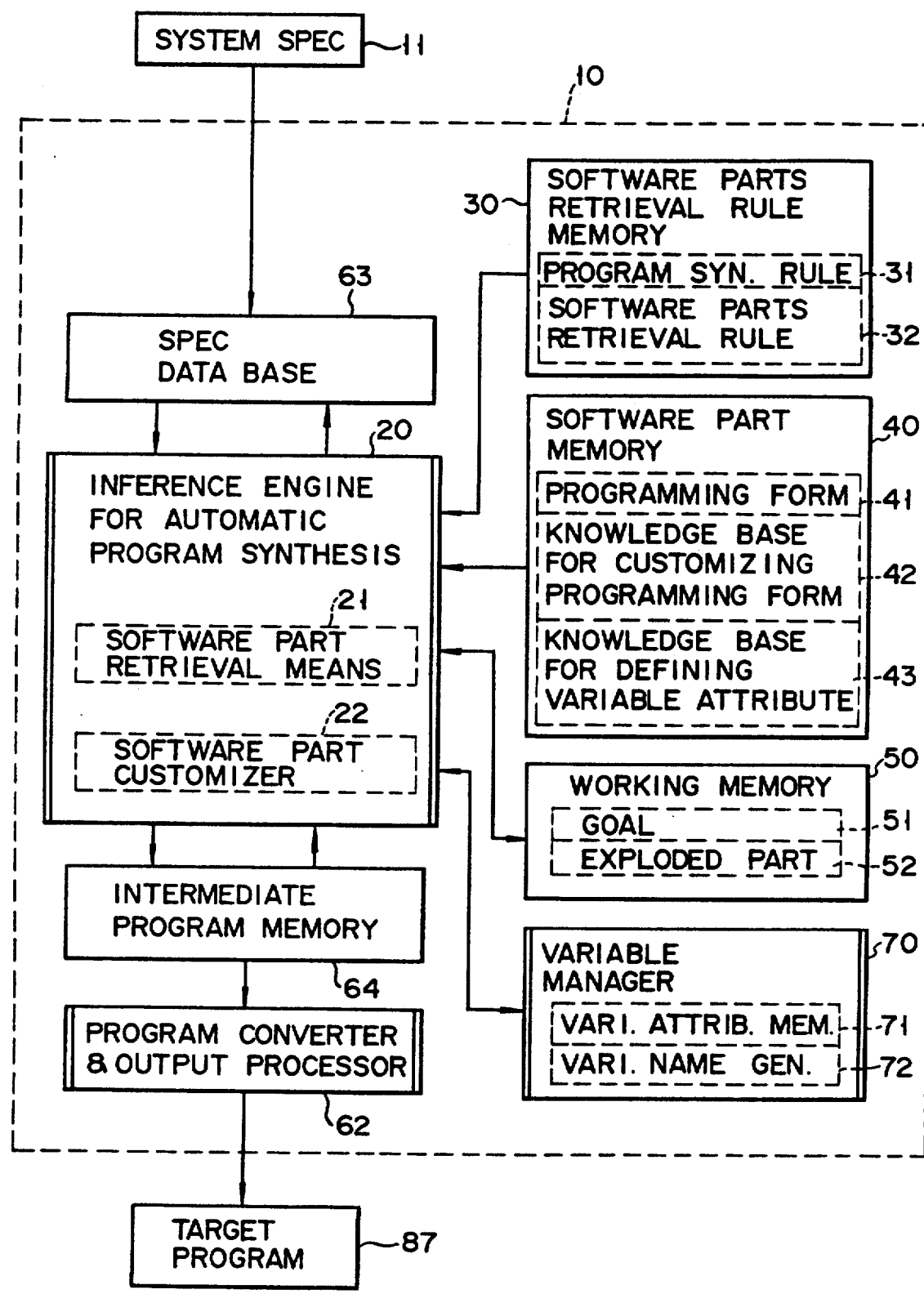
F I G. 1

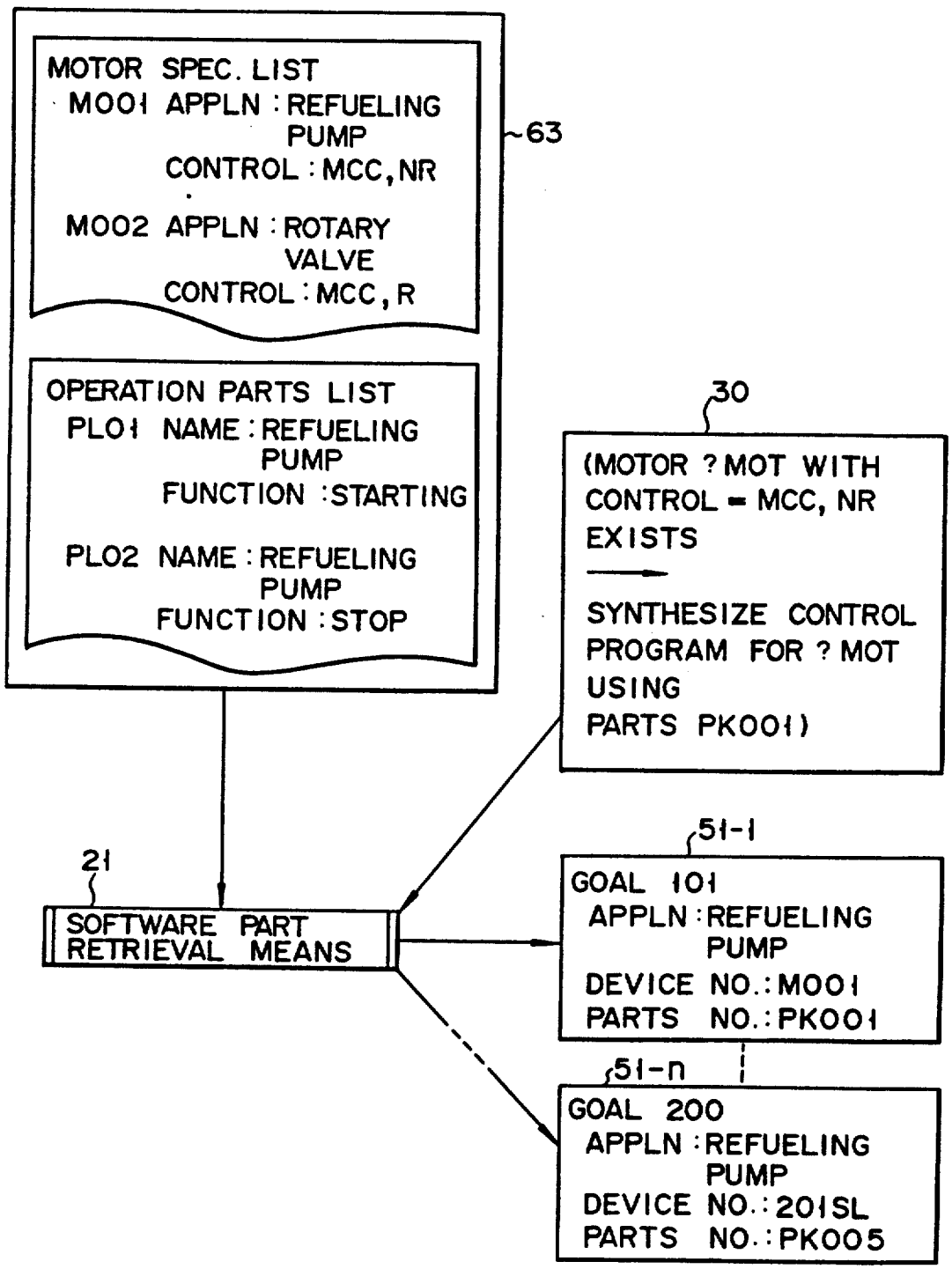
F I G. 4

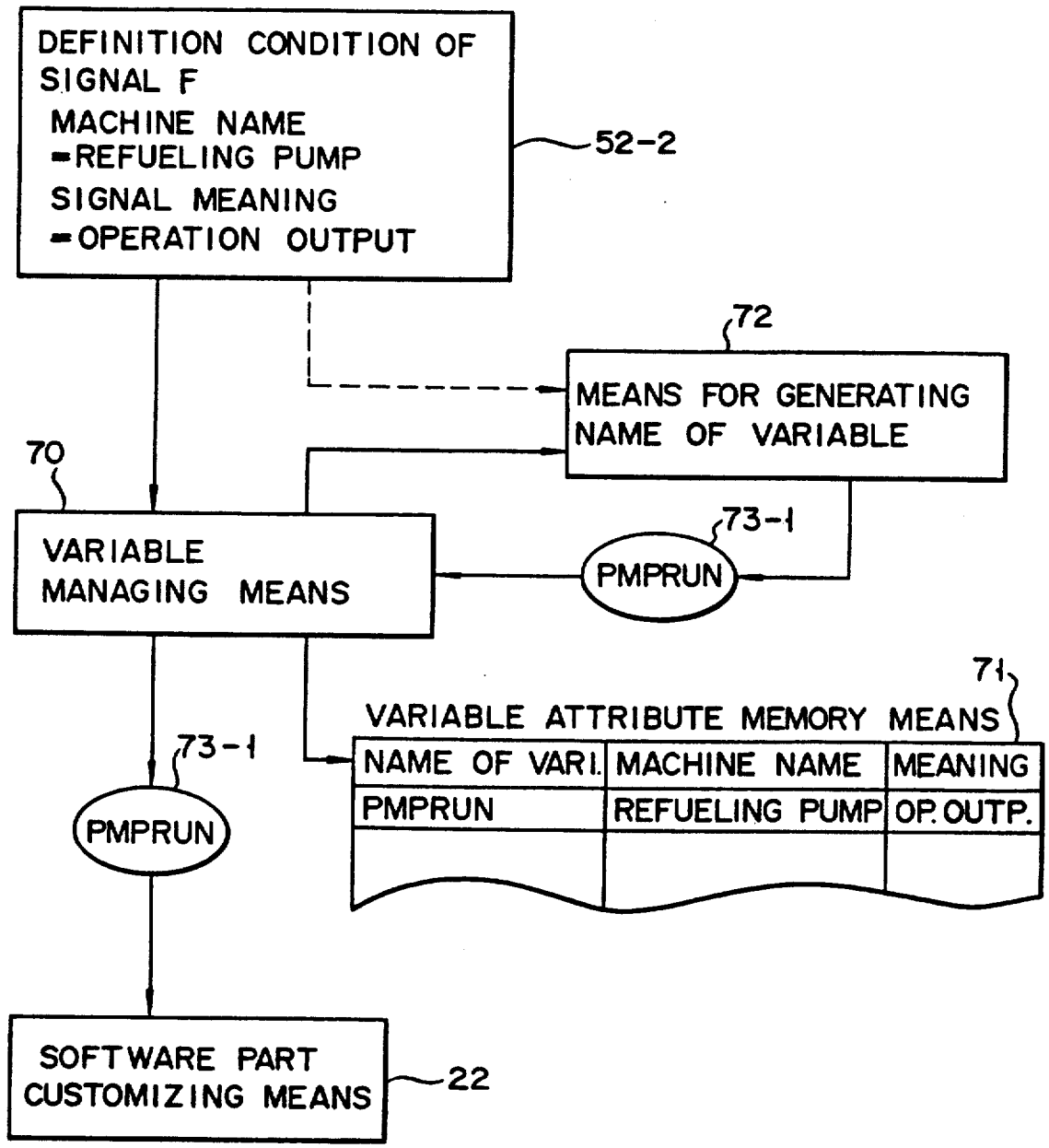
F I G. 7

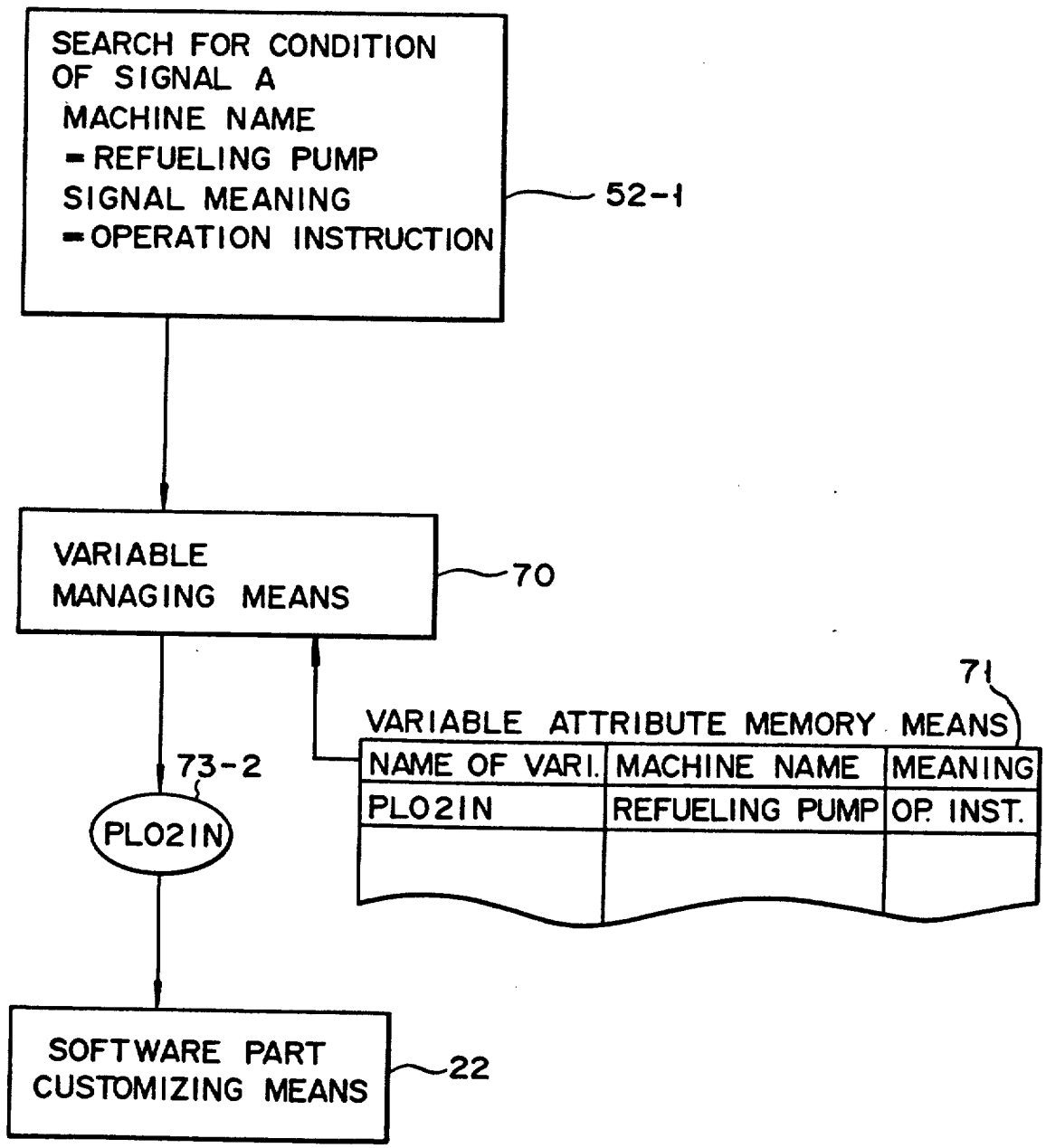
F I G. 8

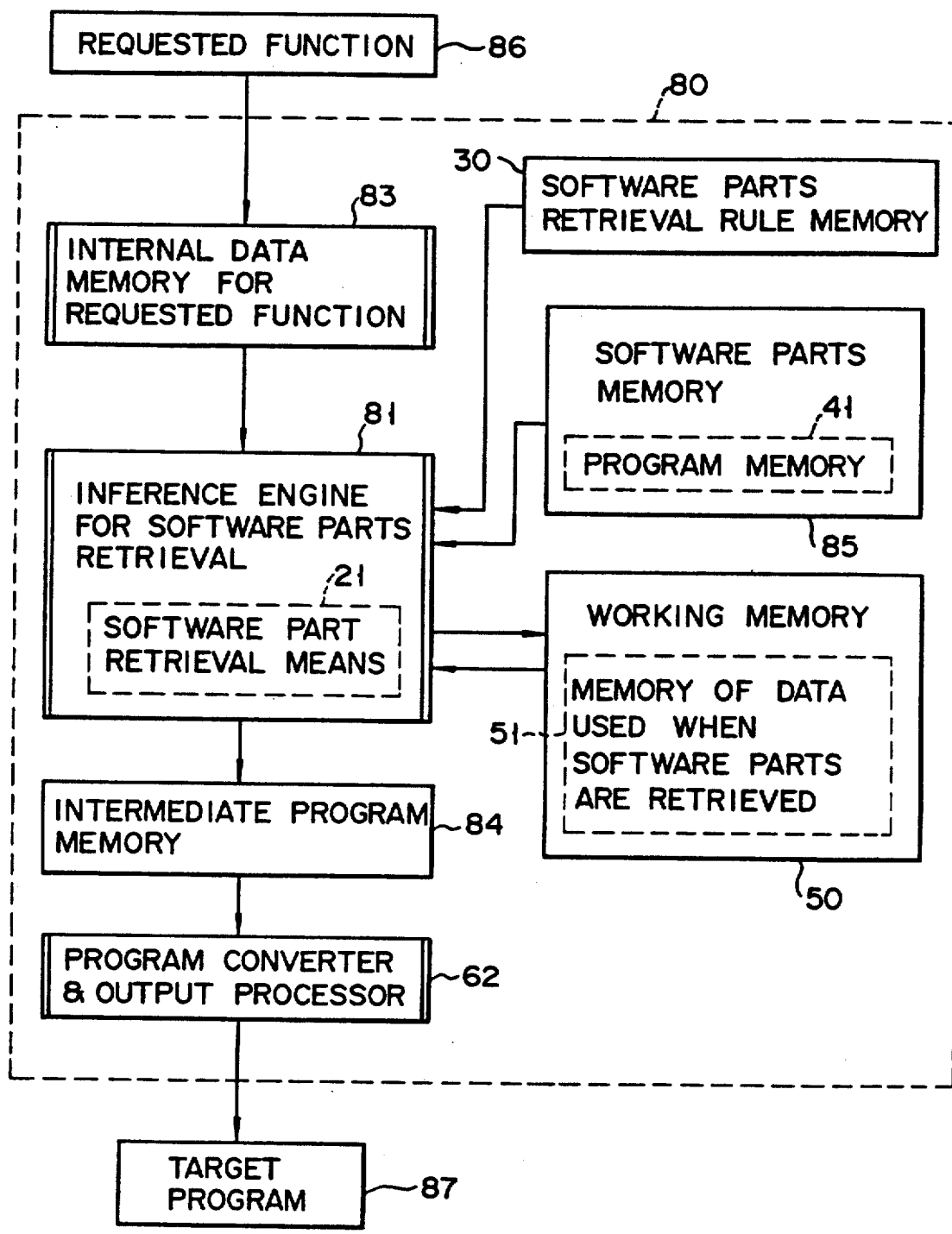
F I G. 9

RULE BASED SYSTEM FOR SYNTHESIZING A PROGRAM SUITED FOR A TARGET SYSTEM IN RESPONSE TO AN INPUT TARGET SYSTEM SPECIFICATION

BACKGROUND OF THE INVENTION

1. Field of the Invention

The present invention relates to a technique of selectively and automatically synthesizing a program suitable for a target system upon input of a system specification of the target system to be controlled by the automatically synthesized program and, more particularly, to a general-purpose automatic program synthesizer and automatic program synthesizing method applicable to not only program design but also hardware circuit design and the like.

2. Description of the Related Art

In recent years, in order to improve productivity of software design, research and development of an automatic program synthesizing system utilizing a knowledge engineering have been actively made. A main stream of such research and development is a software parts retrieving apparatus using a method in which an existing program is considered as defining a software part, and software parts satisfying a requested function are automatically retrieved by a rule representing the requested function.

FIG. 9 is a schematic block diagram showing an arrangement of a software parts retrieval apparatus not adopting the present invention. Conventional software parts searching apparatus 80 comprises inference engine 81 for software parts searching, software parts search rule memory 30 and software parts memory 85. Apparatus 80 receives requested function 86 which defines a function of software parts and outputs target program 87 in accordance with a search rule.

An operation of the above apparatus will be described in detail below with reference to FIG. 9.

Requested function 86 defines a function a software part to be retrieved and is input from a keyboard or a character reading device. The input requested function is stored in internal data memory 83 for requested function.

On the basis of the stored internal data, software part retrieval means 21 incorporated in inference engine 81 retrieves a software part in accordance with a rule stored in software part retrieval rule memory 30 from programs stored in program memory 41 incorporated in software part memory 85. The searched and retrieved program is stored in intermediate program memory 84. The stored program is expressed in a standard language (e.g., a machine language) used in software part retrieving apparatus 80. The internally used language of the program is converted into a language supported by the object or target machine (e.g., a programmable controller, sequencer, etc., using an automatically synthesized software, which is applied to operate the or target plant), by program converter & output processor 62.

Working memory 50 incorporates memory 51 of data used when software parts are retired for storing data to be used in a software part retrieval. When software part retrieval means 21 interprets and executes a software part retrieval rule, write/read of internal data is temporarily performed by using memory 51.

Target program 87 is obtained by converting a parts program retrieved in accordance with the input requested function into a program of a language of the object or target machine (such as a computer, programmable controller, or the like) to be actually used, and is supplied as an output from the software part retrieving apparatus to a CRT display unit or a file unit.

The above-mentioned automatic program synthesizer receives a function with respect to software parts and a requested function defining a connection between software parts, and generates a program.

In a general plant installation, however, a system specification describing how an installed machine is to be driven, the type of drive apparatus of the installation, the type of detector, an application thereof, and the like, exists for each object or target system. Therefore, in order to generate a program of a plant system satisfying the target system specification, a designer must consider a format of the overall program and additionally form the requested function on the basis of the system specification.

The software parts are not general-purpose parts but exclusive parts in which signals constituting the parts, data meanings and a combination thereof are determined in detail in accordance with applications. Therefore, in order to make the requested function coincide with software parts as close as possible, a large number of various types of software parts must be prepared. If the number of software parts is small, parts best suited to a requested function may not be found (retrieval failure). In this case, software parts closest to the requested function are searched and corrected by a designer to satisfy the requested function.

As described above, a current automatic program synthesizer requires much labor and time or a large number of software parts.

SUMMARY OF THE INVENTION

It is an object of the present invention to provide an automatic program synthesizer and an automatic program synthesizing method which allow software parts to have flexibility and can automatically synthesize a program suited to a desired system specification with relatively less labor and a small number of software parts.

In an automatic program synthesizer and an automatic program synthesizing method according to the present invention, a system specification of a target system is input, and a software part suited to the specification is retrieved. In order to obtain a function satisfying the system specification, the retrieved software part is corrected or converted in accordance with a knowledge base for customizing a programming form stored therein.

In order to realize the above object, an automatic program synthesizer of the present invention comprises:

a software part retrieval rule memory portion including a memory section for storing program synthesis is rules which are divided into hierarchial groups in order to divide the requested system specification into simplified functions, and software part retrieval rules for searching a software parts which satisfies the simplified function;

software part memory portion for storing the software part, including a prototype of a program or a program pattern which can be changed and customized to satisfy the simplified function, a program pattern customizing knowledge base for customizing or changing the program pattern so that the program pattern satisfies the system specification, and a memory section for storing a knowledge base for defining an attribute of a variable in the program pattern;

software part retrieval means for obtaining the program synthesis rule from the system specification, and retrieving the software part, having a function requested by the software part retrieval rule, from the obtained program synthesis rule;

variable manager section including a variable name generating section for generating a name of a variable or constant used in the program in accordance with an attribute thereof, and a variable attribute memory section for storing a variable name and an attribute of the variable or constant; and software part customizing means for defining an attribute of the variable according to a variable attribute definition in the software part retrieved by the software part retrieval means, supplying the defined variable attribute to the variable manager section to obtain the variable name, and customizing or changing the program pattern in the software part in accordance with the obtained variable name and the knowledge base for customizing the program pattern in the software parts.

Meanwhile, an automatic program synthesizing method of the present invention comprises the steps of:

obtaining a software part including a program pattern for realizing a basic function of a function requested by a system specification of the system, a program pattern customizing knowledge base for customizing or changing the program pattern so that the program pattern satisfies the system specification, and a knowledge base for defining an attribute of a variable in the program pattern; obtaining a software part retrieval rule including program synthesis rules which are divided into hierarchial groups in order to divide the requested system specification into simplified functions, and software part retrieval rules for retrieving the software parts which satisfies the simplified function; obtaining the program synthesis rules from the system specification; and searching for software parts, having a function requested by the software part retrieval rules, from the obtained program synthesis rule;

generating a name of a variable or constant used in the program in accordance with an attribute thereof, and storing the variable name and the attribute of the variable or constant; and defining an attribute of the variable according to a variable attribute definition in the retrieved software part, obtaining the variable name from the defined variable attribute, and customizing or changing the program pattern form in the software part in accordance with the obtained variable name and the programming form customizing knowledge base in the software part.

Note that the variable in the present invention includes a constant. An internal representation type (e.g., a bit type, an integer type or a floating-type) of the variable is not limited.

BRIEF DESCRIPTION OF THE DRAWINGS

FIG. 1 is a block diagram showing an arrangement of an automatic program generator according to an embodiment of the present invention;

FIG. 4 is a view showing a program synthesizing process of step P1 in the flow chart shown in FIG. 3;

FIGS. 7 and 8 correspond to steps P3 and P4, respectively, and are used for explaining process from a variable name definition to a program, synthesis; and FIG. 9 is a block diagram for explaining problems of an automatic program synthesizer not adopting the present invention.

DETAILED DESCRIPTION OF THE PREFERRED EMBODIMENTS

Figure 2:
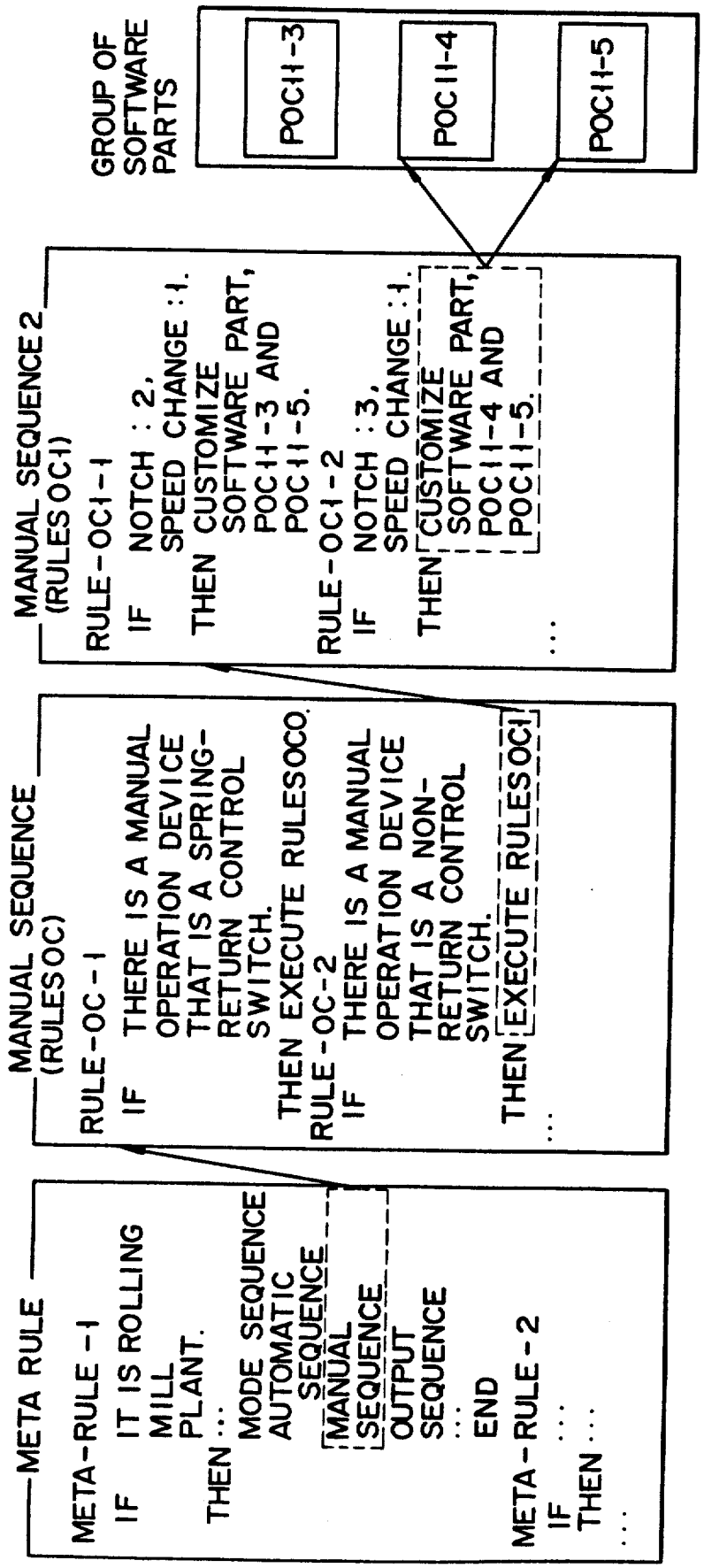
FIG. 2 is a rule expanding view for explaining a rule for retrieving a software part.

A basic arrangement of an automatic program synthesizer of the present invention is as shown in FIG. 1. Prior to explanation of an operation of the present invention, contents of a software part will be described.

A software part used in the present invention include: a program pattern representing a basic means for realizing a predetermined function; a knowledge base for customizing the program pattern used to make the program pattern to match different functions of various system specifications; and a knowledge base for defining a variable used in the program pattern in correspondence with the function. That is, the software part customizing means and a variable manager section define a variable used in the program pattern by using the variable attribute definition in accordance with a function requested by a target system, and then customizes and changes the program pattern by using the knowledge base for customizing a program pattern in accordance with a system specification of the target system to be controlled by the synthesized program. In this manner, the program pattern obtains a function suited to the system specification.

The embodiment of the present invention will be described in more detail below with reference to FIG. 1. In FIG. 1, the same reference numerals as in FIG. 9 denote the same parts and a detailed description thereof will be omitted.

System specification 11 is input from an input means, such as a keyboard or character reading device, to automatic program synthesizer 10.

Input system specification 11 is converted into internal data in a form to be used in synthesizer 10, and the converted data is stored in specification data base 63 for a system specification.

On the basis of the system specification internal data stored in data base 63, software part retrieval means 21 in inference engine 20 for automatic program generating searches for a program synthesis rule stored in program synthesis rule memory 31 in software part retrieval rule memory 30. Upon completion of this searching, software part retrieval means 21 determines a program to be formed to satisfy the specification. Similarly, software part retrieval means 21 searches for a software part retrieval rule corresponding to the determined program from software part retrieval rule memory 32 in memory 30. Software part retrieval means 21 then interprets the software part retrieval rule and sends a software part number suited to the interpreted rule, as well as a goal indicating what program should be synthesized using the software part, to software part customizer 22.

In accordance with the received software parts number, customizer 22 reads out software parts from software part memory 40 according to the part number. These software parts include a program pattern (41) for realizing a basic function of a function requested by target system specification 11, a knowledge base (42) for customizing the program pattern, and a knowledge base (43) for defining an attribute of a variable (or constant) used in the program pattern (41), so that the attribute is specialized to match the system specification. Sequentially, the variable attribute definition or search condition is determined according to the knowledge base (43) in the software part searched for by software part retrieval means 21 and is supplied to variable attribute manager 70.

In accordance with a given variable attribute definition or search condition, if the given condition is a definition condition, variable name generator 72 generates a new variable name and stores the meaning of the variable attribute definition or search condition together with the new variable name in memory 71. If the given condition is a search condition, generator 72 searches a variable name of a variable or constant corresponding to the meaning of the variable attribute definition or search condition from memory 71 and sends the searched variable name together with the new variable to software part customizer 22. The synthesized program is stored in intermediate program memory 64.

Working memory 50 temporarily stores data used in program synthesis or software part retrieval in goal memory 51 or exploded part memory 52. Program converter & output processor 62 and target program 87 are equivalent to those shown in FIG. 9. The program synthesis rule and the software part retrieval rule will be described below with reference to FIG. 2.

In order to satisfy a certain target system specification, a function requested by the specification is divided. Referring to FIG. 2, the left column (meta rule) represents a program synthesis rule. Normally, in the program synthesis rule, inference conditions to be executed in a system are sequentially arranged. Each inference condition is further divided. The middle left column (Rules Oc) in FIG. 2 represents divided inference conditions. The middle right column (Rules Ocl) in FIG. 2 shows conditions obtained by subdividing the divided conditions in the middle left column. Software parts for realizing the respective functions represented in the middle right column are represented by a group of parts in the rightmost column.

The software part retrieval rule represents an order of the inference tasks in the middle left and right columns shown in FIG. 2. The program synthesis rule most roughly represents a function requested by a system specification as a group of very small functions. The software part retrieval rule further divides each function represented by the program synthesis rule, and subdivides each of the divided functions stepwise, thereby representing a function which can be realized by software parts.

Figure 3:
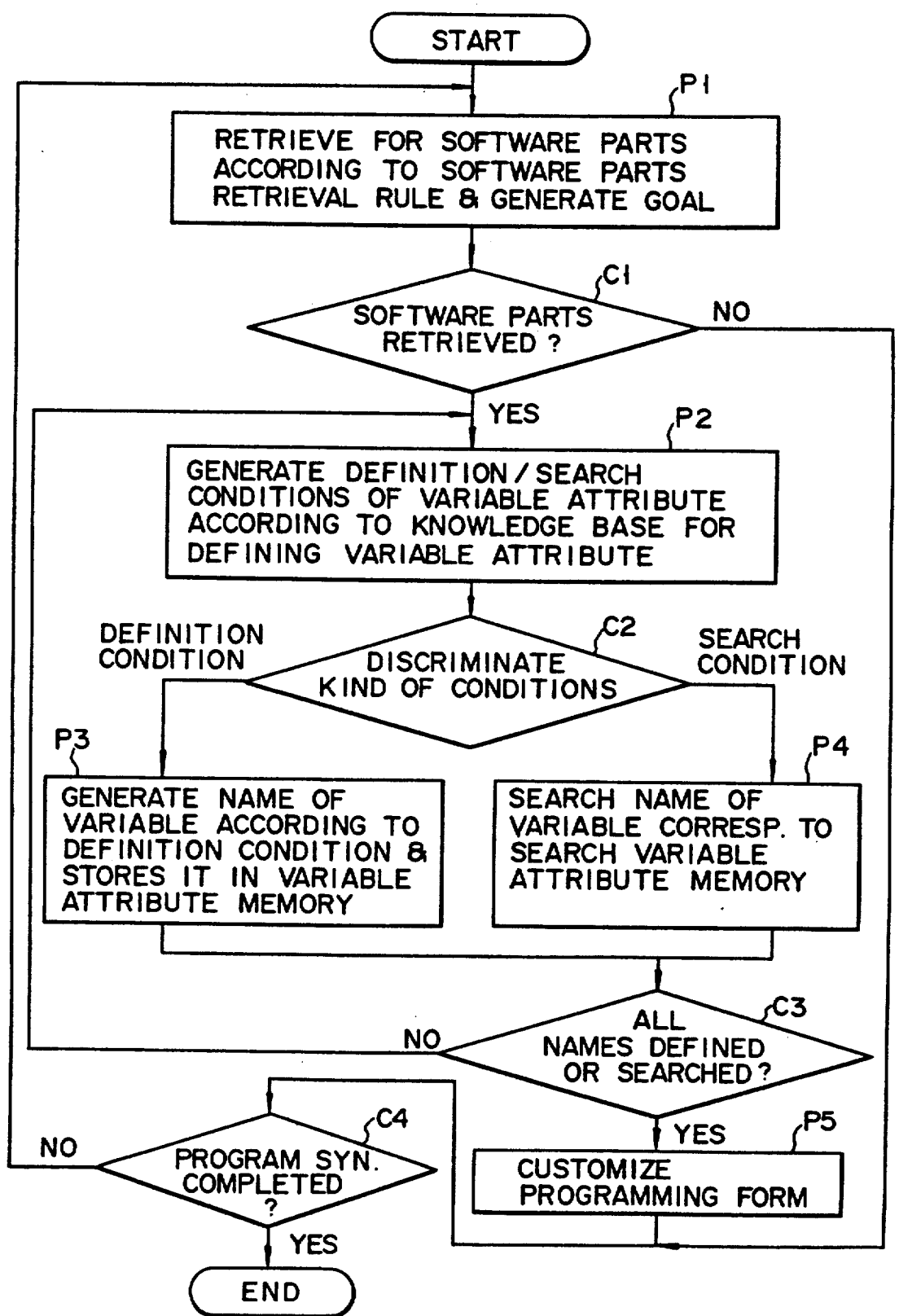
FIG. 3 is a flow chart for explaining a processing flow in an automatic program synthesizer according to the embodiment of the present invention.

FIG. 3 is a flow chart for explaining processing tasks executed in inference engine 20.

When automatic program generating processing is started, in step P1, software part retrieval means 21 reads out the program synthesis rule from software part retrieval rule memory 30 and, subsequently, generate a goal for synthesizing a program in accordance with the program synthesis rule. Then, software part retrieval means 21 reads out the software part retrieval rule from software part retrieval rule memory 30. In accordance with the readout rule, a software part which matches the contents of the goal is searched. In step C1, it is checked whether a software part which matches with the goal is searched retrieved in step P1.

If it is determined that a software part is searched retrieved in step C1, the following process is treated with software part customizer 22 and variable attribute manager 70. More specifically, in step P2, definition/search conditions of a variable attribute used in the searched for software part are generated according to the goal obtained at step P1 and a knowledge base (43) for defining a variable attribute in the software part received from software part retrieval means 21.

In step C2, it is checked whether the generated condition is a definition or search condition. If the generated condition is a definition condition, in step P3, a new variable name is generated according to the definition condition and stored together with the definition condition in variable attribute memory 71. After storage, the new variable name (definition variable) is supplied to inference engine 20.

If the generated condition is a search condition, in step P4, a variable name corresponding to the search condition is searched from memory 71, and its signal name (reference variable) is extracted.

In step C3, it is checked whether all variable names used in the program pattern are defined. If not all the variable names are defined, steps P2, C2, P3, P4 and C3 are repeatedly executed.

More specifically, steps P2, C2, P3, P4, and C3 represent processing of variable attribute manager 70. In these steps, all names of variables used in the program pattern are defined in steps P3 and P4 in accordance with the knowledge base (43) for defining a variable attribute customized in step P2.

If it is determined in step C3 that al the variable names are defined, in step P5, the program pattern in the software part is customized according to the definition and reference variables defined in steps P3 and P4, respectively. That is, in step P5, a temporary variable name used in the software part is replaced with the variable name generated in step P3 or that searched in step P4.

In step C4, it is checked whether all of possible programs corresponding to the target system specification stored in specification data base 63 are completely generated. If not all the programs corresponding to the system specification are generated, the flow returns to step P1, and the procedure in FIG. 3 is resumed. If it is determined that all the programs corresponding to the system specification are generated, the processing shown in FIG. 3 is ended.

Figure 5:
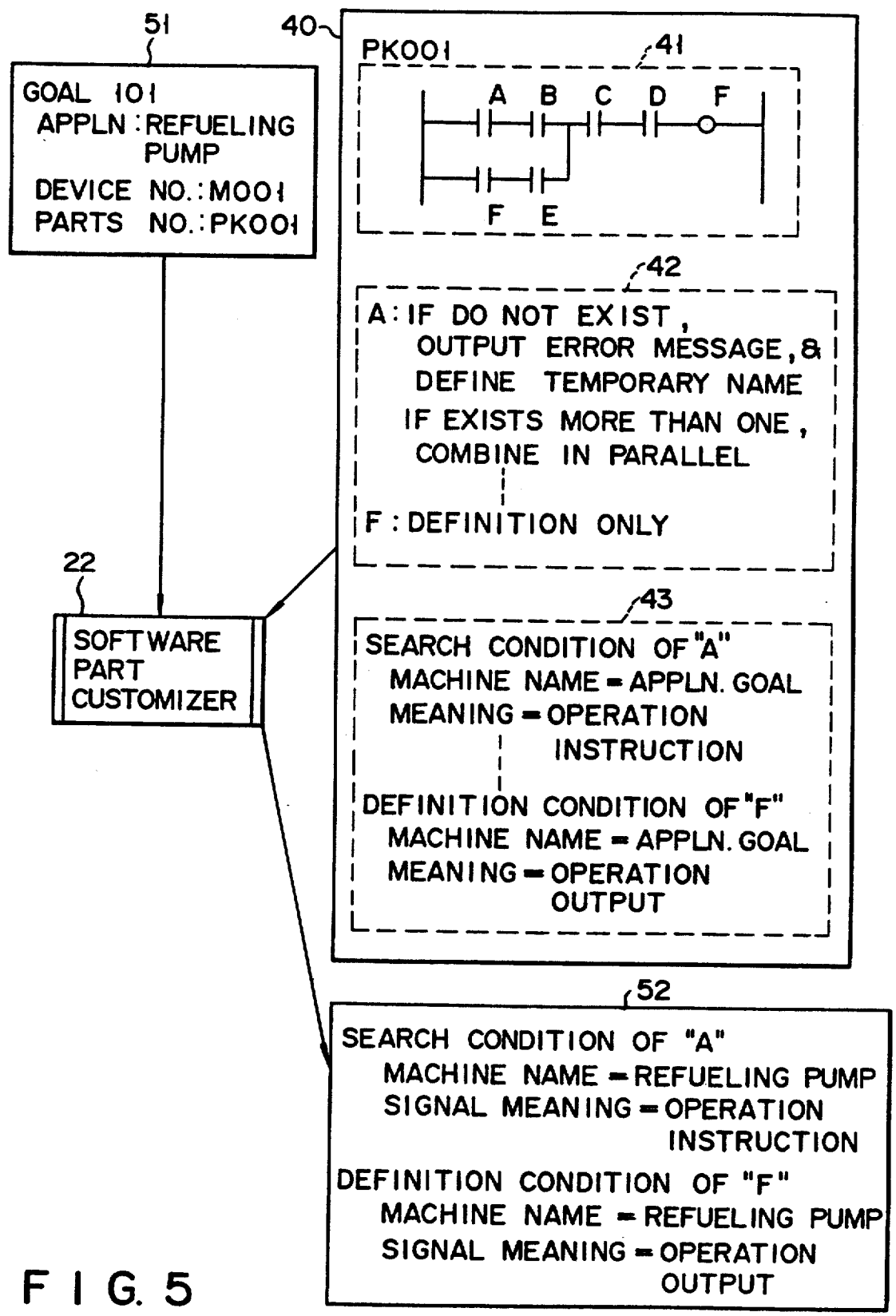
FIG. 5 shows process in which a search condition of variable and a definition condition are produced according to a variable attribute definition in software part PK001, and according to GOAL101 shown in FIG. 4.
Figure 6:
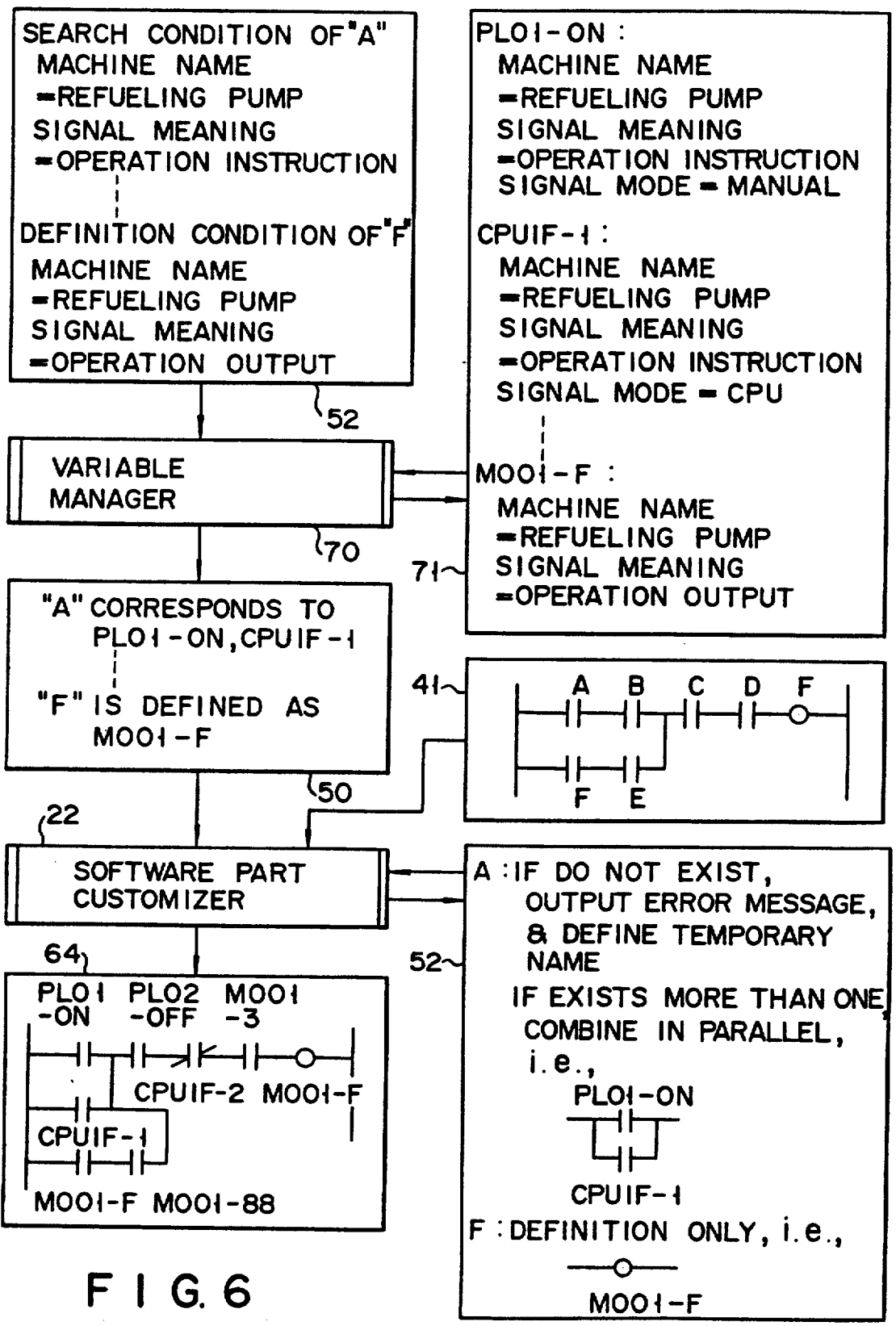
FIG. 6 is a view explaining process in steps P3 to P5 of the flow chart shown in FIG. 3.

FIGS. 4, 5, and 6 show various data contents and data flows in software parts searching of a refueling pump sequence according to the present invention.

FIG. 4 corresponds to step P1 in FIG. 3. Referring to FIG. 5, software part retrieval means 21 interprets system specification internal data stored in specification data base 63. In accordance with the software part retrieval rule stored in software part retrieval rule memory 30, software parts are searched. Upon searching, used data are stored in goal memory 51 (51-l to 51-n) as follows.

In the arrangement shown in FIG. 1, assume that a rule representing

```
"(Motor ?MOT with
    Control = MCC, NR
    Exists
    →
    Prepare Control Program
    for ?MOT Using Parts PK001)"
``` is stored in software part retrieval rule memory 30. In this case, by referring to specification data base 63,

```
"M001 Application: Refueling Pump
    Control: MCC, NR . . .",
``` for example, is determined to be a motor corresponding to ?Mot of the retrieval rule from a predetermined motor specification list. Goal memory 51 (=51-1) then stores, e.g.,

```
"GOAL010
    Application: Refueling Pump
    Device No.: M001
    Parts No.: PK001".
```

Thereafter, customizing of software part PK001 is started.

FIG. 5 shows a process of generating search and definition conditions of a variable in accordance with a knowledge base for defining a variable attribute in software PK001. FIG. 5 corresponds to step P2 in FIG. 3.

Referring to FIG. 5, while software part customizer 22 refers to the software part (in this case, software part with ID name PK001) read out from software part memory 40 and the contents of goal memory 51 (=51-1), it customizes the knowledge stored in the variable attribute definition (43) to form customized parts, and stores the customized parts in exploded part memory 52.

Referring to FIG. 5, symbols A, B, C, D, and E used in the program pattern (41) represent variables used to refer to other software parts from the readout software parts, and symbol F represents a variable defined by the software parts. The knowledge base (43) thus represents a method of defining variables having temporary names of A, B, C, ..., F, i.e., a method of determining correct variable names.

For example, assume that the variable attribute definition (43) stores a knowledge representing

```
"Search Condition of "A"
    Machine Name = Application Goal
    Meaning = Operation Instruction"
``` and the contents of the referred goal represent

```
"Machine Name: Refueling Pump
    Device No.: M001
    Parts No.: PK001".
```

In this case,

```
"Search Condition of "A"
    Machine Name = Refueling Pump
    Signal Meaning = Operation Instruction"
``` is generated as a condition of A.
Similarly,

```
"Definition Condition of "F"
    Machine Name = Refueling Pump
    Signal Meaning = Operation Instruction"
``` is generated as a definition condition of variable F.

FIG. 6 shows processing contents in steps P3 to P5 shown in FIG. 3.

Referring to FIG. 6, if a definition condition of a variable to be defined is given, variable attribute manager 70 transfers the definition condition of variable F received from software part customizer 22 to variable attribute generator 72 (FIG. 1). In this case, manager 72 generates variable name M001-F.

When manager 70 receives correct variable name M001-F of variable F, it registers name M001-F together with the definition condition of variable F in variable attribute memory 71 and then supplies name M001-F to customizer 22.

If a search condition of a variable to be defined is given, manager 70 searches, from memory 71, a variable name of a variable corresponding to the search condition of a variable received from customizer 22. This will be described with reference to FIG. 6.

Exploded part memory 52 initially stores

```
"Search Condition of "A"
    Machine Name = Refueling Pump
    Signal Meaning = Operation Instruction"
``` as a search condition of variable A. Therefore, searching is performed to check whether a variable satisfying the above condition is already defined in memory 71. Upon searching,

```
"PL01-ON:
    Machine Name = Refueling Pump
    Signal Meaning = Operation Instruction
    Signal Mode = Manual"
and
"CPUIF-1:
    Machine Name = Refueling Pump
    Signal Meaning = Operation Instruction
    Signal Mode = CPU"
``` are found. In this case, manager 70 supplies searched variable names PL01-ON and CPUIF-1 to customizer 22. Similarly, variable names of variables B, C, . . . , F are searched.

In accordance with the variable names searched or defined as described above, customizer 22 changes the names of variables A, B, . . . , F in the program pattern stored in program pattern memory 41 to correct variable names, transfers the obtained program to intermediate program memory 64, and stores the transferred program therein.

If a plurality of variables or no variable are returned for a single searched variable, combining, deletion, selection, and the like of variables are performed according to the knowledge base (42) for customizing a program pattern.

Referring to FIG. 6, the contents

```
"(= F (and (or (and A B)
```

-continued

```
          (and E F))
       C D)"
``` of program pattern 41 are replaced with

```
"(= M001-F (and (or
              PL01-ON
              CPUIF-1
       (and M001-F M001-88)
              PL02-OFF
              (not CPUIF-2
              M001-3))"
``` and stored in intermediate program memory 64. (A block of memory 64 in FIG. 6 schematically shows a format of the replaced program.) In this manner programs for goal are sequentially generated.

The variable names and their attributes stored in variable attribute memory 71 can be referred to (or accessed by) any software parts. Since a certain variable name and its variable attribute can be commonly referred to by a plurality of software parts, different software parts are combined at a level of this meaning.

For example, when software part PK005 is to be customized according to goal GOAL200 stored in goal memory 51-n shown in FIG. 4, assume that one variable to be searched from PK005 is

```
"Search Condition of "X"
    Machine Name = Refueling Pump
    Signal Meaning = Operation Output".
```

In this case, manager 70 returns variable name M001-F according to variable condition X.

If goal contents differ from each other but software parts numbers are identical, e.g., if goal contents are

```
"Machine Name: Ventilating Fan
 Device No.: M009
 Parts No.: PK001",
``` a search condition of variable A is obtained as

```
"Search Condition of "A"
    Machine Name = Ventilating Fan
    Signal Meaning = Operation Instruction".
```

In this case, a variable name different from variable names PL01-ON and CPUIF-1 shown in FIG. 6 are searched. Similarly, a different variable name is defined for variable F.

FIG. 7 corresponds to the processing in step P3 shown in FIG. 3. Referring to FIG. 7, according to the definition condition of signal E received from software part customizer 22, variable attribute memory means 71 transfers the definition condition to means 72 for generating a name of a variable. Means 72 generates variable name 73-1 according to the meanings of words in the received definition condition.

In this embodiment, a dictionary (not shown) defining abbreviations of the words used in means 72 is prepared therein to generate a variable name from a combination of the abbreviations. In this case, means 72 generates and supplies variable name "PMPRUN" 73-1 to managing means 70.

When managing means 70 receives correct variable name 73-1 (PMPRUN), means 70 supplies name PMPRUN together with the contents of the definition condition of signal E to software part customizer 22.

FIG. 8 corresponds to the processing in step P4 shown in FIG. 3. Referring to FIG. 8, variable attribute managing means 70 searches, from variable attribute memory means 71, a variable name of a variable corresponding to a condition represented by search condition 52-1 of signal A received from software part customizer 22. In FIG. 8, variable name PL02IN is searched. Managing means 70 supplies searched variable name 73-2 (PL02IN) to customizer 22.

Similarly, variable names 73-2 of signals B, C, and D are searched.

In accordance with variable names 73-1 and 73-2 searched or defined in the methods described in FIGS. 7 and 8, customizer 22 changes signals A, B, . . . , E in the program pattern, stored in program pattern memory 41, into correct variable names. The program thus obtained is transferred to and stored in intermediate program memory 64.

In this manner, programs corresponding to goals are sequentially generated. Variable names and attributes thereof stored in variable attribute memory means 71 can be referred to form any software parts. For this reason, different software parts can be combined at a meaning level.

In this embodiment, as is apparent from comparison between the contents of the variable attribute definition (43) and the contents (variable attribute definition and search condition) of exploded part memory 52 shown in FIG. 5, a general description is given in the variable attribute definition (43), and a specialized description is given according to a goal in the variable attribute definition and search of the exploded part memory (52). Thus, this specialized description expresses the specialized meaning of a variable.

More specifically, an application range of a single software part can be widened by changing a general meaning to a special meaning. At the same time, even if the same software parts are used any number of times upon designing of one system, programs having different meanings can be reliably generated when goals of the programs to be generated are different. In addition, since a single general-purpose program part is finely corrected or adjusted in accordance with a given object, a program more faithful to a system specification can be automatically synthesized.

As described above, according to the present invention, a desired program can be automatically synthesized upon input of a system specification. For this reason, labor and time required for program development can be greatly reduced. In addition, since each of software parts has a knowledge base for customizing and changing a program pattern, software parts are flexible, and the numbers of software parts and software part retrieval rules can be decreased as a whole. Therefore, a software part retrieval rule is free from complexity. Also, since each software part includes a knowledge base for customizing a program pattern, the automatic program synthesizer of the present invention can flexibly correspond to correction/change of the program pattern. Furthermore, the number of limitations of adopting a single software part is smaller than that of a conventional system, i.e., a retrieval rule and software parts are roughly combined. For this reason, even if software parts are optionally corrected or changed, the software part retrieval rule need not always be changed or modified. Similarly, even when the software part retrieval rule is changed, software parts need not always be changed.

Note that the following literature discloses a technique related to the present invention and includes the present inventor as one of authors:

Yasuko Ono et al., "Artificial Intelligence Based Programmable Controller Software Designing" *Proceedings of the International Workshop on Artificial Intelligence for Industrial Application* PP. 85-90.

All the contents disclosed in the above literature are incorporated in the present application.

What is claimed is:

1. An automatic program synthesizer for synthesizing a program suited for a target system in response to input of a system specification of the target system to be controlled by the program, comprising:

a software part retrieval rule memory portion including a memory section for storing program synthesis rules which are divided into hierarchial groups for reducing the target system specification into simplified functions, and software part retrieval rules for searching for software parts which satisfy the simplified functions;

a software part memory portion for storing said software parts, including a program pattern defining a prototype program for customization to satisfy a given simplified function, a program pattern customizing knowledge base for customizing or changing the program pattern so that the program pattern satisfies the system specification, and a memory section for storing a knowledge base for defining an attribute of a variable in the program pattern;

software part retrieval means for obtaining the program synthesis rule from the system specification, and for searching for the software part, having a function requested by the software part retrieval rule, from the obtained program synthesis rule;

variable manager section including a variable name generating section for generating a name of a variable or constant used in the program in accordance with an attribute thereof, and a variable attribute memory section for storing a variable name and an attribute of the variable or constant; and software part customizing means for defining an attribute of the variable according to a variable attribute definition in the software part searched for by said software part retrieval means, supplying the defined variable attribute to said variable manager section to obtain the variable name, and customizing or changing the program pattern in the software part in accordance with the obtained variable name and the knowledge base for customizing the program in the software part.

2. A method of automatically synthesizing a program suited for a target system in response to input of a system specification of the target system to be controlled by the program, comprising the steps of:

obtaining a software part including a program pattern for realizing a function requested by the system specification of said target system, a program pattern customizing knowledge base for customizing or changing the program pattern so that the program pattern satisfies the system specification, and a knowledge base for defining an attribute of a variable in the program pattern; obtaining a software part retrieval rule including program synthesis rules which are dividing into hierarchial groups for reducing the target system specification into simplified functions, and software part retrieval rules for searching for software parts which satisfy the simplified functions; obtaining the program synthesis rule from the system specification; and searching for a software part, having a function requested by the software part retrieval rule, from the obtained program synthesis rule;

generating a name of a variable or constant used in the program in accordance with an attribute thereof, and storing the variable name and the attribute of the variable or constant; and defining an attribute of the variable according to a variable attribute definition in the searched software part, obtaining the variable name from the defined variable attribute, and customizing or changing the program pattern of the software part in accordance with the obtained variable name and the program pattern customizing knowledge base in the software part.

3. An automatic program synthesizer for synthesizing a program suited for a target system in response to input of a system specification of the target system to be controlled by the program, comprising:

program synthesis rule memory means for storing software synthesis rules which are divided into hierarchial groups for reducing the target system specification into simplified functions;

software part retrieval rule memory means for storing software part retrieval rules which is used for searching for software parts which satisfy the simplified functions;

program pattern memory means for storing a program pattern for customization to satisfy a given simplified function, the program pattern including a variable having a predetermined attribute;

memory means for storing a program pattern customizing knowledge base for customizing or changing the program pattern so that the program pattern satisfies the system specification;

memory means for storing a variable attribute definition in the program pattern;

software part retrieval means for obtaining the program synthesis rule from the system specification, and for searching for a software part, having a function requested by the software part retrieval rule, from the obtained program synthesis rule; and program customizing means for defining an attribute of the variable according to the variable attribute definition in the software part retrieved by said software part retrieval means, obtaining a variable name from the defined variable attribute, and customizing or changing the program pattern in the software part in accordance with the obtained variable name and program pattern customizing knowledge base in the software part.

4. A program synthesizer according to claim 3, further comprising:

variable name generating means for generating a variable name of a variable or constant used in the program in accordance with an attribute thereof; and variable attribute memory means for storing the variable name and the attribute thereof.

5. A program synthesizer according to claim 3, further comprising:
means for storing a program customized or changed by said program customizing means, and converting the stored program into a target program expressed in a predetermined language.

6. A program synthesizer according to claim 3, further comprising:
data memory means of a system specification for converting the system specification into intermediate data used in the automatic program synthesizer, storing the converted intermediate data, and supplying the stored data to said software part retrieval means.

7. A program synthesizer according to claim 3, further comprising:
memory means for temporarily storing data used to search the software part.

8. An automatic program synthesizer for synthesizing a program suited for a target system in response to input of a system specification of the target system to be controlled by the program, comprising:
a software part retrieval rule memory portion including a memory section for storing program synthesis rules which are divided into hierarchial groups for reducing the target system specification into simplified functions, and software part retrieval rules for searching for software parts which satisfy the simplified function;
a software part memory portion for storing said software parts, including a program pattern defining a prototype program for customization to satisfy a given simplified function, a program pattern customizing knowledge base for customizing or changing the program pattern so that the program pattern satisfies the system specification, and a memory section for storing a knowledge base for defining an attribute of a variable in the program pattern;
software part retrieval means for obtaining the program synthesis rule from the system specification, and for searching for the software part, having a function requested by the software part retrieval rule, from the obtained program synthesis rule;
variable manager section including a variable name generating section for generating a name of a variable or constant used in the program in accordance with an attribute thereof, and a variable attribute memory section for storing a variable name and an attribute of the variable or constant;
software part customizing means for defining an attribute of the variable according to a variable attribute definition in the software part searched for by said software part retrieval means, for supplying the defined variable attribute to said variable manager section to obtain the variable name, and for customizing or changing the program pattern in the software part in accordance with the obtained variable name and the knowledge base for customizing the program in the software part; and
intermediate memory means for storing each program synthesized by the automatic program synthesizer according to a defined variable attribute thereof, the software part customizing means also searching the intermediate memory means for the attribute of the variable defined by the software part customizing means.

9. A method of automatically synthesizing a program suited for a target system in response to input of a system specification of the target system to be controlled by the program, comprising the steps of:
obtaining a software part including a program pattern for realizing a function requested by a system specification of said system, a program pattern customizing knowledge base for customizing or changing the program pattern so that the program pattern satisfies the system specification, and a knowledge base for defining an attribute of a variable in the program pattern; obtaining a software retrieval rule including program synthesis rules which are dividing into hierarchial groups for reducing the target system specification into simplified functions, and software part retrieval rules for searching for software parts which satisfy the simplified function; obtaining the program synthesis rule from the system specification; and searching for a software part, having a function requested by the software part retrieval rule, from the obtained program synthesis rule;
generating a name of a variable or constant used in the program in accordance with an attribute thereof, and storing the variable name and the attribute of the variable or constant;
defining an attribute of the variable according to a variable attribute definition in the searched software part, obtaining the variable name from the defined variable attribute, and customizing or changing the program pattern of the software part in accordance with the obtained variable name and the program pattern customizing knowledge base in the software part;
storing each program synthesized according to a defined variable attribute thereof; and
searching each program synthesized for the attribute of the variable according to the variable attribute definition.

10. An automatic program synthesizer for synthesizing a program suited for a target system in response to input of a system specification of the target system to be controlled by the program, comprising:
program synthesis rule memory means for storing software synthesis rules which are divided into hierarchial groups for reducing the target system specification into simplified functions;
software part retrieval rule memory means for storing software part retrieval rules which is used for searching for software parts which satisfy the simplified functions;
program pattern memory means for storing a program pattern for customization to satisfy the simplified function, the program pattern including a variable having a predetermined attribute;
memory means for storing a program pattern customizing knowledge base for customizing or changing the program pattern so that the program pattern satisfies the system specification;
memory means for storing a variable attribute definition in the program pattern;
software part retrieval means for obtaining the program synthesis rule from the system specification, and for searching for a software part, having a function requested by the software part retrieval rule, from the obtained program synthesis rule;
program customizing means for defining an attribute of the variable according to the variable attribute definition in the software part retrieved by said software part retrieval means, obtaining a variable name from the defined variable attribute, and customizing or changing the program pattern in the software part in accordance with the obtained variable name and program pattern customizing knowledge base in the software part; and intermediate memory means for storing each program synthesized by the automatic program synthesizer according to a defined variable attribute thereof, the program customizing means searching the intermediate memory means for the attribute of the variable defined by the program customizing means.

* * * * *